United States Patent [19]
Maemura

[11] Patent Number: 5,535,350
[45] Date of Patent: Jul. 9, 1996

[54] CACHE MEMORY UNIT INCLUDING A REPLACEMENT ADDRESS REGISTER AND ADDRESS UPDATE CIRCUITRY FOR REDUCED CACHE OVERHEAD

[75] Inventor: Kouji Maemura, Kanagawa, Japan

[73] Assignee: NEC Corporation, Tokyo, Japan

[21] Appl. No.: 907,920

[22] Filed: Jul. 2, 1992

[30] Foreign Application Priority Data

Jul. 5, 1991 [JP] Japan ..................... 3-165850

[51] Int. Cl.⁶ .................... G06F 12/12; G06F 13/00
[52] U.S. Cl. .............. 395/403; 395/421.03; 395/421.09;
395/460; 395/486; 395/494; 395/464; 364/DIG. 1;
364/243.41; 364/247.2; 364/933.2; 364/948;
364/957.9; 364/964.2; 364/DIG. 2
[58] Field of Search ..................... 395/425, 375,
395/250, 403, 445, 460, 461, 462, 463,
481, 486, 494, 495, 421.03, 421.07, 421.08,
421.09, 464

[56] References Cited

U.S. PATENT DOCUMENTS

| | | | |
|---|---|---|---|
| 4,095,269 | 6/1978 | Kawabe et al. ........................ | 395/250 |
| 4,314,331 | 2/1982 | Porter et al. ........................... | 395/460 |
| 4,802,113 | 1/1989 | Onishi et al. .......................... | 395/375 |
| 4,888,679 | 12/1989 | Fossum et al. ....................... | 395/800 |
| 5,285,527 | 2/1994 | Crick et al. ............................ | 395/445 |
| 5,327,536 | 7/1994 | Suzuki .................................... | 395/375 |

*Primary Examiner*—Glenn Gossage
*Attorney, Agent, or Firm*—Whitham, Curtis, Whitham & McGinn

[57] ABSTRACT

A cache memory unit to be incorporated in a microprocessor reduces overhead caused by cache misses by processing all main memory replacement data at the same time as their registration or storage in the cache memory during a replacement access cycle. For this purpose, the cache memory unit includes a prefetch pointer to store the address for retrieval of cache memory, an address updater to update an internal address of the cache memory, and a cache control circuit to control the cache memory unit. When a cache miss occurs, the address causing the miss is stored in a replacement address register and, until the main memory replacement data is stored in the cache memory, the contents in the replacement address register are output to an internal address bus. On the other hand, the contents in the prefetch pointer are selectively updated.

9 Claims, 7 Drawing Sheets

COMBINATIONAL CIRCUIT

| T1 | T2 | RPREQ | TOT1 | TOT2 |
|----|----|-------|------|------|
| —  | —  | 0     | 0    | 0    |
| 0  | —  | 1     | 1    | 0    |
| 1  | —  | —     | 0    | 1    |

CACHE MEMORY UNIT INCLUDING A REPLACEMENT ADDRESS REGISTER AND ADDRESS UPDATE CIRCUITRY FOR REDUCED CACHE OVERHEAD

BACKGROUNDS OF THE INVENTION

1. Field of the Invention

This invention relates to a microprocessor, and particularly relates to a cache memory unit characterized by its cache replacement control when the incorporated cache memory misses.

2. Description of the Prior Art

Recent microprocessors tend to incorporate a cache memory for speedy memory access. Microprocessors, however, require a number of control circuits inside and the cache memory capacity cannot be more than a few kilobytes due to limitation imposed by chip size. This results in a low hit ratio at present. Under such circumstances, what determines the performance of a microprocessor with an incorporated cache memory is the time needed to update the cache memory with data retrieved from main memory when a cache miss occurs.

In a typical microprocessor with incorporated cache memory, an instruction code is transferred from a cache memory unit to an instruction decoding unit via an internal data bus. When capable of processing another instruction code, the instruction decoding unit requests the cache memory unit to provide the next instruction code.

Retrieval from the cache memory is performed according to the contents on the internal address bus. If the cache memory hits, the data in the cache memory is output to the internal data bus. If the cache memory misses, the cache control circuit requests a cache replacement and the bus timing control circuit activates bus cycles for access to an external main memory for cache replacement. The data read from the external main memory is output to the internal data bus and then registered or written to the cache memory.

Next, the cache replacement operation is described. When the cache memory hits, the internal address is updated by an address updater and kept at a prefetch pointer. If the cache memory misses, the prefetch pointer holds the internal address which caused the cache miss until the completion of bus cycles and outputs the replacement address to the cache memory.

When the cache memory hits, the internal data contained in the cache is immediately output to the internal data bus, but when it misses, the data accessed from the external main memory during a bus cycle sequence (replacement is usually performed with a plurality of bus cycles) is output to the internal data bus. During cache replacement, the cache memory registers or writes the replacement data, that is, the data read from the external main memory is stored in the cache memory.

In principle, the cache memory may be searched with the address which caused the cache miss, upon completion of cache replacement. However, since data for the access which caused the cache miss is transferred directly to the instruction decoding unit during and after cache replacement, cache memory is searched with the address updated for only the most recent access.

As mentioned above, a conventional microprocessor with incorporated cache memory processes replacement data (such as decoding of instruction) for no more than one access at the same time as it registers data to cache memory so as to reduce overhead in replacement. For example, therefore, when there are replacement data for the last four accesses, the replacement data for the three oldest accesses must be retrieved again with the cache memory after replacement. This cannot improve overhead so much. In addition, the prefetch pointer must output the replacement address to the cache memory during cache memory replacement. If more data needs to be processed after the first access, the contents of the prefetch pointer storing the replacement address must be updated for data processing after completion of each replacement. This complicates the processing and delays the next access to the cache memory after replacement by the amount of time required for address updating.

SUMMARY OF THE INVENTION

An object of the present invention is to provide a cache memory unit to be incorporated in a microprocessor which can reduce overhead in replacement when the cache memory misses by eliminating conventional drawbacks described above.

Another object of the present invention is to provide a cache memory unit to be incorporated in a microprocessor which enables easy address updating during cache memory replacement and thereby further enabling high speed access to the cache memory after completion of replacement.

According to a preferred embodiment of the present invention to attain these objects, a cache memory unit to be incorporated in a microprocessor comprises a cache memory, a first register means for storing an address for retrieval of data from the cache memory, an address updating means for updating the address stored in the first register means when a cache hit occurs, a second register means for storing an address which caused a cache miss when a cache miss occurs, a bus cycle control means for initiating a bus cycle clock sequence for cache replacement from main memory when a cache miss occurs, and a replacement control means for supplying the address stored in the second register means to the cache memory and for selectively updating the address stored in the first register means while the second register means supplies the address to the cache memory.

According to another preferred embodiment of the present invention, the replacement control means comprises an output means for outputting a write instruction signal which, when a cache miss occurs, instructs the writing of the address which caused the cache miss to the second register means, and a drive instruction signal to read the address written to the second register means.

According to another preferred embodiment of the present invention, the bus cycle control means comprises a means for generating a bus cycle clock sequence for cache replacement based on a replacement data request signal from the replacement control means, and a means for outputting a store instruction signal causing replacement data obtained during the bus cycle clock sequence to be registered in the cache memory.

According to still another preferred embodiment, the replacement control means comprises a means for outputting a transfer instruction signal to cause the replacement data registered in the cache memory to be forwarded via an internal data bus to an instruction decoding means in the microprocessor.

According to further preferred embodiment of the present invention to attain the above objects, a cache memory unit to be incorporated in a microprocessor comprises a cache memory, a first register means for storing an address for retrieval of data from the cache memory, an address updating means for updating the address stored in the first register means, a second register means for storing an address which caused a cache miss when a cache miss occurs, and a replacement control means for selectively updating the address stored in the first register means while the second register means supplies the address to the cache memory.

According to another embodiment, the replacement control means comprises a means for outputting, when a cache miss occurs, a write instruction signal that instructs the writing of the address which caused the cache miss to the second register means, and a drive instruction signal to read the address written to the second register means. Alternatively, the replacement control means comprises a means for outputting a transfer instruction signal to forward the replacement data registered in the cache memory to the instruction decoding means in the microprocessor via the internal data bus.

DESCRIPTION OF THE PREFERRED EMBODIMENT

Figure 4:
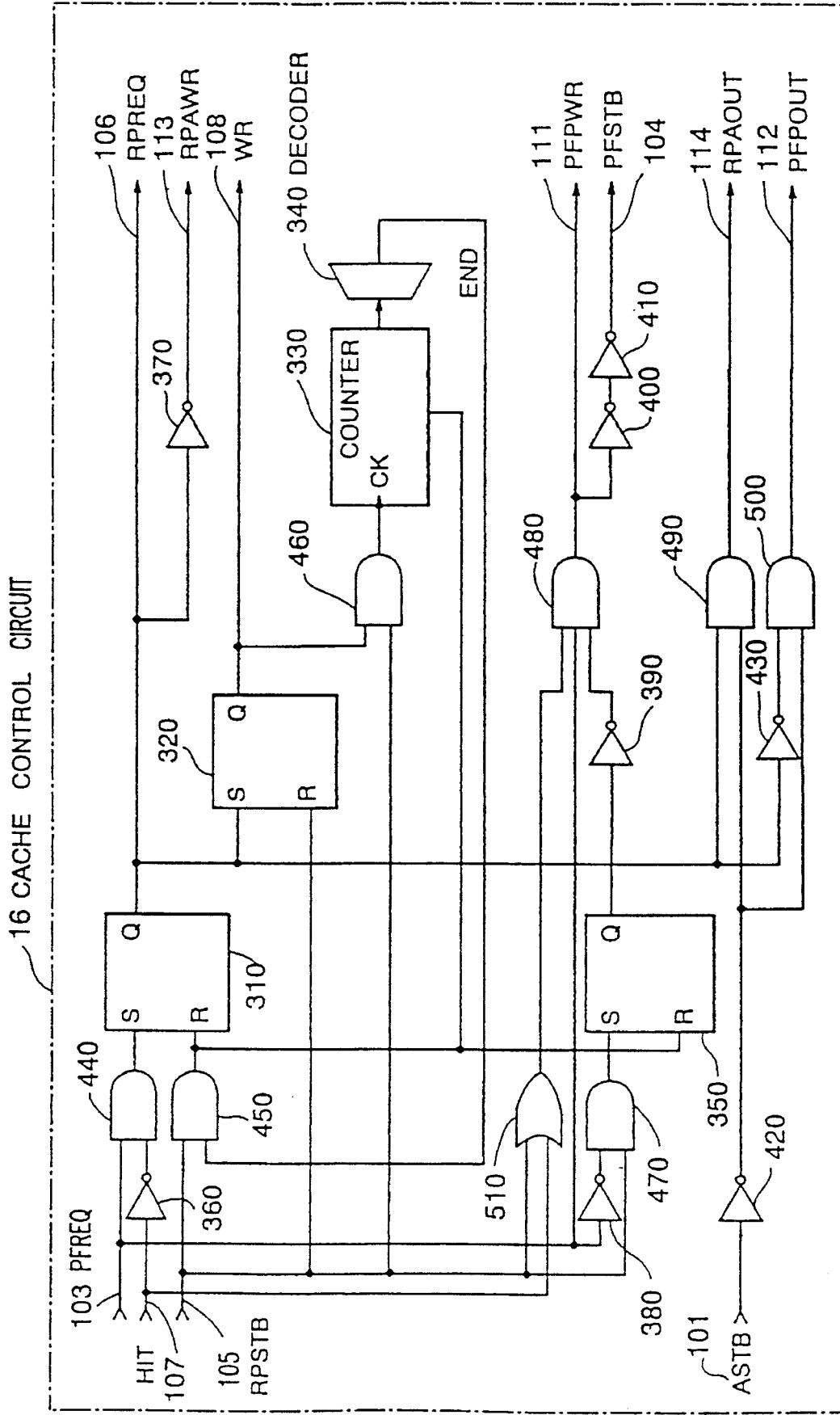
FIG. 4 is a block diagram to show the internal configuration of the cache control circuit of FIG. 1.
Figure 5:
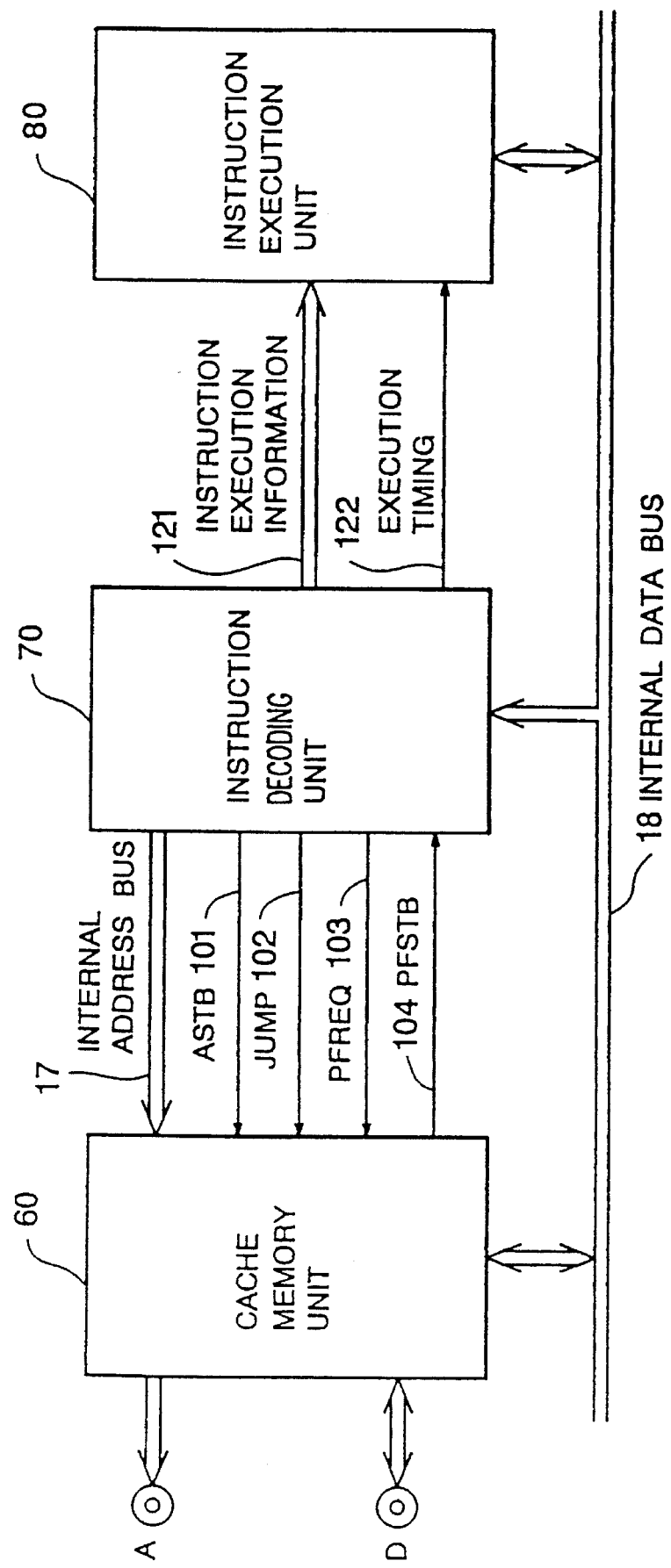
FIG. 5 is a block diagram to show the general configuration of a microprocessor incorporating the cache memory unit according to the present invention.

Referring to FIGS. 1 to 8, preferred embodiments of the present invention will be described. Firstly, FIG. 5 shows the entire configuration example of a microprocessor incorporating a cache memory unit according to the present invention. In FIG. 5, the microprocessor comprises a cache memory unit 60 consisting of a cache memory and a control means therefor (shown in FIG. 1), an instruction decoding unit 70 for decoding instruction codes sent from the cache memory unit 60 and an instruction execution unit 80 for executing instructions such as arithmetic operations. The procedures of instruction execution with this microprocessor are described below.

An instruction code is transferred from the cache memory unit 60 to the instruction decoding unit 70 via an internal data bus 18. At the same time, the cache memory unit 60 notifies the instruction decoding unit 70 of the validity or integrity of the contents in the internal data bus 18 using instruction code transfer signal (PFSTB) 104. When being capable of processing another instruction code, the instruction decoding unit 70 requests the cache unit 60 to provide the next instruction code using instruction code request signal (PFREQ) 103. After decoding of an instruction code by the instruction decoding unit 70, information required for execution of the instruction such as operation information is output as the instruction execution information 121 and processed at the instruction execution unit 80 according to execution timing signal 122.

Sometimes instructions are not executed in the same order as they are stored in memory, requiring the microprocessor to jump to a different area of memory. This is called a branch instruction. When access to memory is required as in the case of branch instruction (branch destination address signal (JUMP) 102) or memory operand, the instruction decoding unit 70 transfers the applicable memory address to the cache memory unit 60 via an internal address bus 17. The transfer of address is notified to the cache memory unit 60 with address transfer signal (ASTB) 101.

Figure 1:
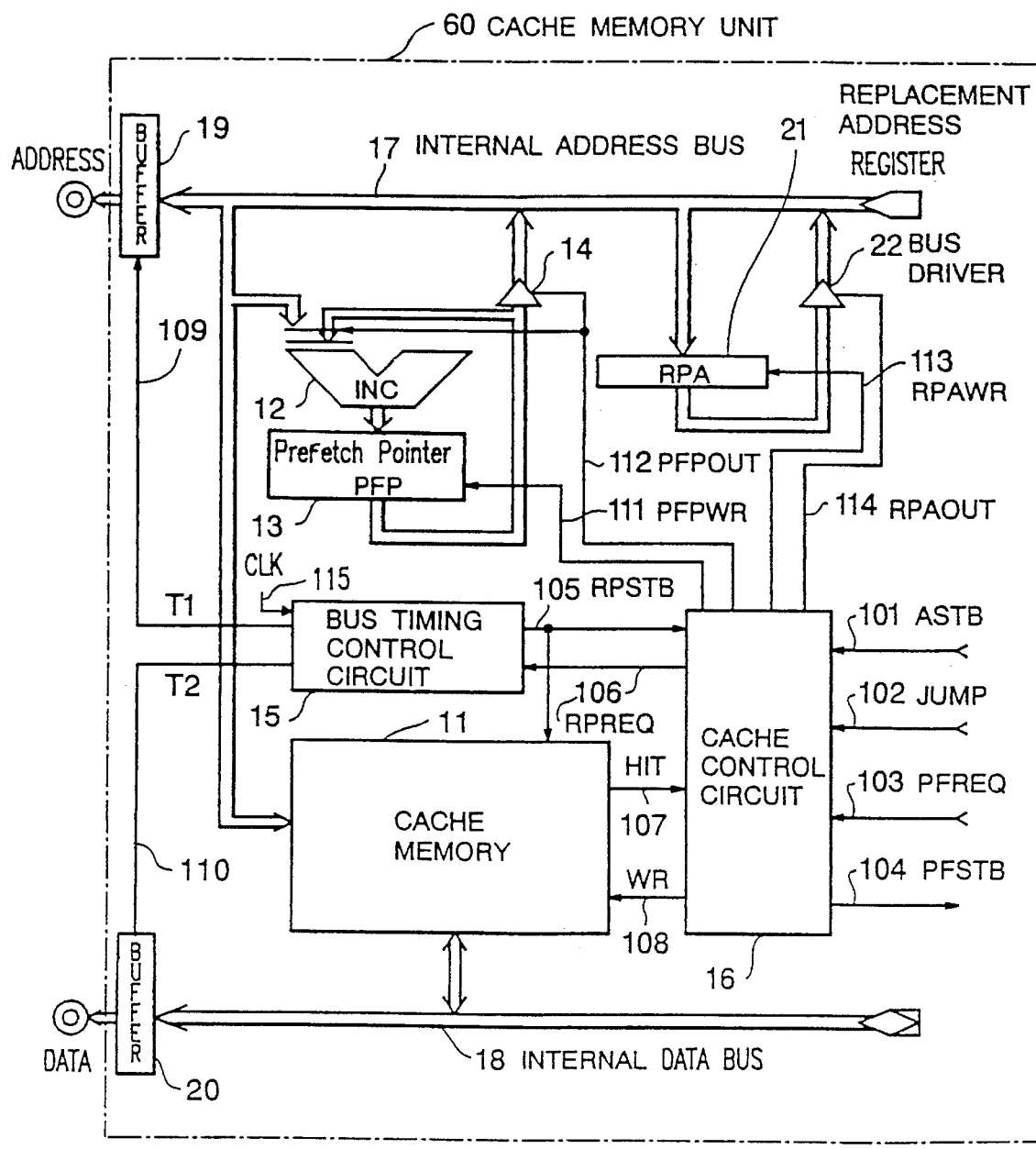
FIG. 1 is a block diagram to show the configuration of a cache memory unit according to an embodiment of the present invention.

FIG. 1 is a block diagram showing the configuration of the cache memory unit 60 according to an embodiment of the present invention, which is incorporated in a microprocessor shown in FIG. 5.

According to FIG. 1, the cache memory unit 60 comprises a cache memory 11, a prefetch pointer (PFP) 13 as a first register to store and index the addresses in cache memory 11, an address updater (INC) 12 which updates the contents in the prefetch pointer 13, a bus driver 14, a bus timing control circuit 15 which generates a bus cycle signal to commence a cache replacement sequence when an external memory access is required, an internal address bus 17, an internal data bus 18, an address buffer 19, a data buffer 20, a replacement address register (RPA) 21 as a second register for storing the address with which the cache memory 11 misses, a bus driver 22, and a cache control circuit 16 to control the cache and replacement operations for the cache memory 11.

The cache control circuit 16 above is provided with control means to selectively update the contents in the prefetch pointer 13 even while the replacement address register 21 supplies an address to the cache memory 11. In FIG. 1, ADDRESS indicates an external address terminal and DATA an external data terminal.

Figures 2, 3:
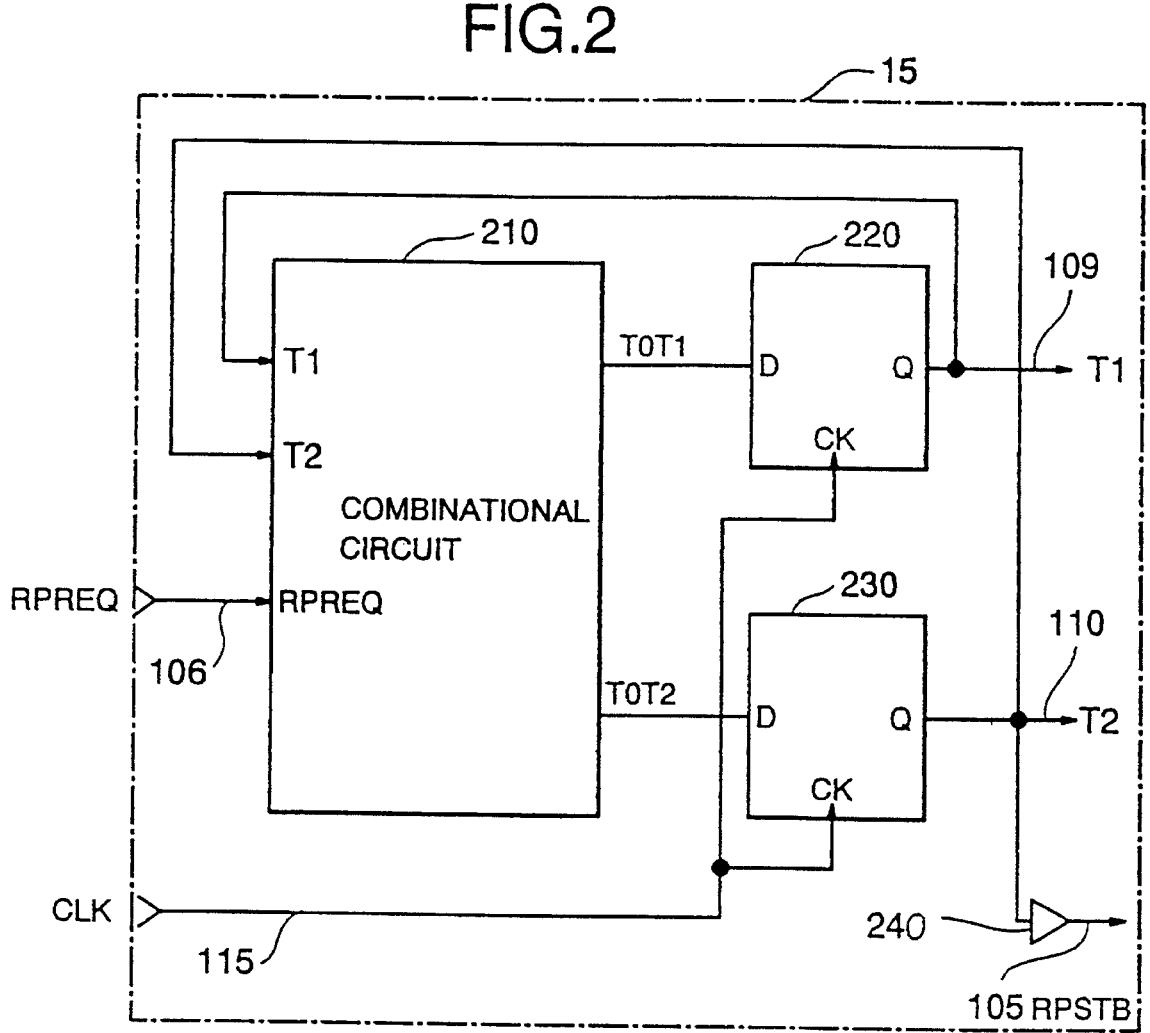
FIG. 2 is a block diagram to show the internal configuration of a bus timing control circuit in FIG. 1.
FIG. 3 is a diagram to show a truth table for a combinational circuit in the bus timing control circuit.

FIG. 2 is a block diagram to show the internal configuration of the bus timing control circuit 15. In FIG. 2, the numeral 210 indicates a combinational circuit, 220 and 230 indicate D-type flip-flops and 240 is a buffer. FIG. 3 is a truth table for the combinational circuit.

As shown in FIG. 3, a bus cycle activated by the bus timing control circuit 15 has two clock signals T1 and T2. T1 generates the timing for address output to the external address terminal ADDRESS and T2 generates the timing for data input from the external data terminal DATA.

When the cache memory 11 misses (i.e. when a cache miss occurs), replacement is performed for each block or grouping of data; this requires a plurality of bus cycles. In this embodiment, it is supposed that the data can be divided into words and that one block has four words. A counter 330 in the cache control circuit 16 shown in FIG. 4 (described later) counts the number of bus cycles required for cache replacement of one block of data.

FIG. 4 is a block diagram to show the details of the cache control circuit 16. In FIG. 4, the cache control circuit 16 comprises RS-type flip-flops 310, 320 and 350, a counter 330, a decoder 340, inverters 360, 370, 380, 390, 400, 410, 420 and 430, AND circuits 440, 450, 460, 470, 480, 490 and 500 and an OR circuit 510.

The cache control circuit 16 is designed so that the inverter 370 outputs RPA write instruction signal (RPAWR) 113, the AND circuit 490 outputs RPA drive instruction signal (RPAOUT) 114, the AND circuit 480 outputs PFP write signal (PFPWR) 111 and the AND circuit 500 outputs PFP drive signal (PFPOUT) 112. The counter 330 is a two-bit counter and counts up for each replacement data transfer signal (RPSTB) 105. The decoder 340 decodes the two-bit output from the counter 330 and makes the "END" signal active when the logical value of the output is "11". In other words, the decoder 340 detects the fourth bus cycle and makes "END" active.

Now the operation of the cache memory unit according to this embodiment is outlined with reference to FIGS. 1 and 5.

The instruction decoding unit 70 outputs a memory address to the internal address bus 17. Then, if the cache memory 11 hits, the address in the internal address bus 17 is updated by the address updater 12 and stored in the prefetch pointer 13. Thereafter, the address in the prefetch pointer 13 is output to the internal address bus 17.

If the cache memory misses, the applicable address is stored in the replacement address register 21, and until the replacement of the cache memory 11 is completed, the contents in the replacement address register 21 are output, as the replacement address, to the internal address bus 17 via the bus driver 22.

The cache memory 11 is indexed according to the contents in the internal address bus 17. If the cache memory 11 hits, it makes the hit signal (HIT) 107 active and outputs the data in the cache to the internal data bus 18. If the cache memory 11 misses, the cache control circuit 16 makes the cache replacement request signal (RPREQ) 106 active and the bus timing control circuit 15 activates a bus cycle sequence for accessing external main memory. The data read from the external main memory is, via the data buffer 20, output to the internal data bus 18 and then registered to or stored in the cache memory 11, completing the cache replacement sequence.

Figure 6:
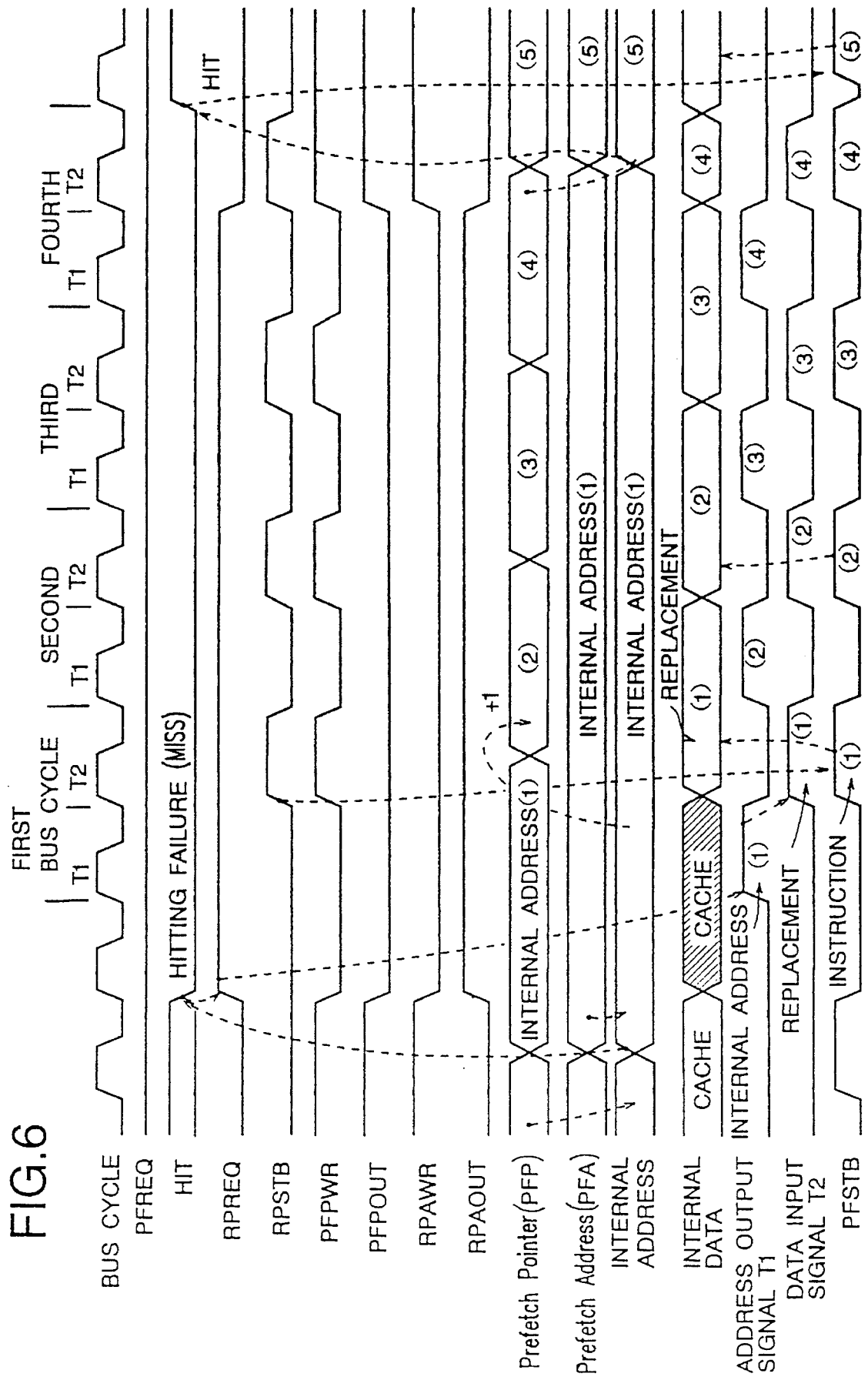
FIG. 6 is a timing chart of replacement processing by the cache memory unit according to an embodiment of the present invention.
Figure 7:
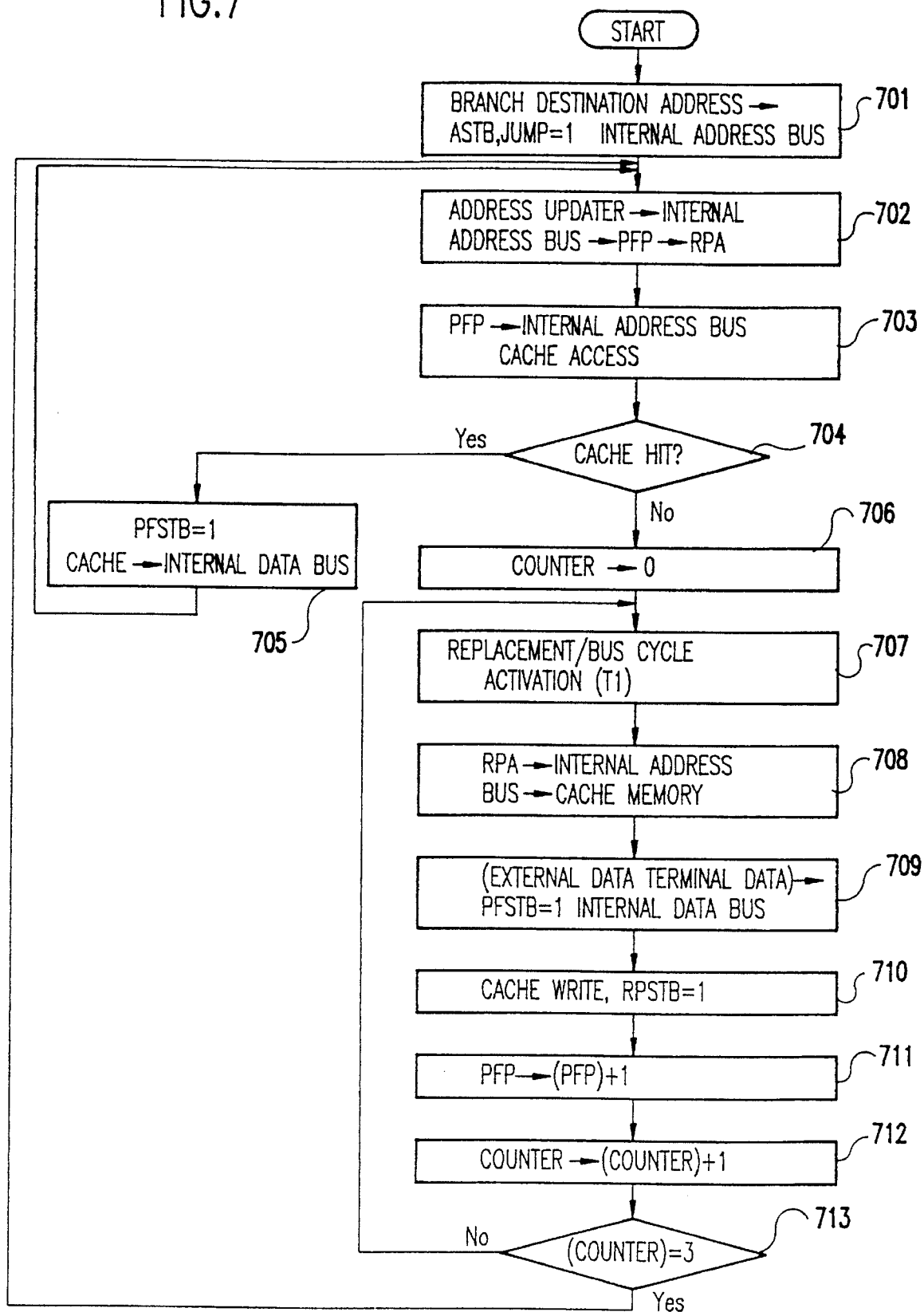
FIG. 7 is a flowchart to illustrate the operation of the cache memory unit according to an embodiment of the present invention.

Now referring to the timing chart of FIG. 6 and the flowchart of FIG. 7, the control for the cache memory unit 60 is described focusing on the cache replacement sequence. It is supposed here that the replacement of the cache memory 11 requires four bus cycles.

If, in FIG. 5, a branch instruction requires access to memory, the instruction decoding unit 70 outputs the internal address of the branch destination as the signal (JUMP) 102 to the internal address bus 17 and that address is transferred to the cache memory unit 60. The transfer of the address is notified to the cache memory unit 60 by causing the address transfer signal (ASTB) 101 to become active (Step 701). Thereafter, except in the case of a jump instruction, the address updater 12 updates the internal address in the internal address bus 17 and the updated internal address is stored in the prefetch pointer 13 and the internal address stored in the prefetch pointer 13 is stored in the replacement address register 21 (Step 702) (See also FIG. 1).

Then, the prefetch pointer 13 outputs the internal address for access to the cache memory 11 to the internal address bus 17 and the cache memory 11 is read (Step 703). The cached data (instruction code) is transferred to the instruction decoding unit 70 via the internal data bus 18 by making hit signal (HIT) 107 active.

If the cache memory 11 hits properly ("Yes" at Step 704), the internal address is updated by the address updater 12 and stored again at the prefetch pointer 13, and by activation of instruction code transfer signal (PFSTB) 104, validity or integrity of the contents in the internal data bus 18 is notified to the instruction decoding unit 70 (Step 705). Then, the unit returns to Step 702.

If the cache memory 11 misses at Step 704, the counter 330 at the cache control circuit 16 is firstly cleared (Step 706). Then, the cache control circuit 16 makes the cache replacement request signal (RPREQ) 106 active and thereby causes the bus timing control circuit 15 to activate the bus cycle sequence as described above for accessing the external main memory in order for cache replacement (Step 707).

The replacement address register 21 keeps the internal address of the cache miss (internal address (1) in the timing chart) until the completion of four bus cycles. During replacement, with RPA drive instruction signal (RPAOUT) 114 being active, the replacement address (internal address (1)) is output from the replacement address register 21 to the cache memory 11 via the internal address bus 17 (Step 708). The replacement address is output from the external address terminal ADDRESS to the external main memory via the address buffer 19, and data is read from the external main memory.

The external data read from the main memory is input from the external data terminal DATA at T2 in the bus cycle and output to the internal data bus 18, with the replacement data transferred to the instruction decoding unit 70 at the same time (by making the instruction code transfer signal (PFSTB) 104 active) (Step 709).

The cache memory 11 enters write mode (the write signal (WR) 108 is active) during cache replacement, and each time the replacement data transfer signal (RPSTB) 105 becomes active, stores the replaced data (replacement data (1), (2), (3) and (4) in the timing chart) (Step 710).

Each time a replacement bus cycle is activated, the PFP write instruction signal (PFPWR) 111 becomes active and the prefetch pointer 13 updates its contents (the internal address of the cache miss) and indexes the cache memory 11 after completion of replacement (Step 711). The counter 330 in the cache control circuit 16 counts up (+1) (Step 712).

After that, until the counter 330 in the cache control circuit 16 detects the fourth bus cycle and makes the END signal active (Step 713) (See also FIG. 4), the procedures from the Step 707 are repeated, executing replacement of blocks of data and simultaneously transferring the replacement data to the instruction decoding unit 70.

Thus, in this embodiment, all replacement data can be transferred to the instruction decoding unit 70 at the same time as it is registered or stored to the cache memory 11; this may reduce overhead in cache replacement.

After completion of replacement, with the prefetch pointer 13 storing the address updated by data transfer in the processing at Steps 712 and 702 (internal address (5)), the cache memory 11 is indexed by the internal address (5).

Figure 8:
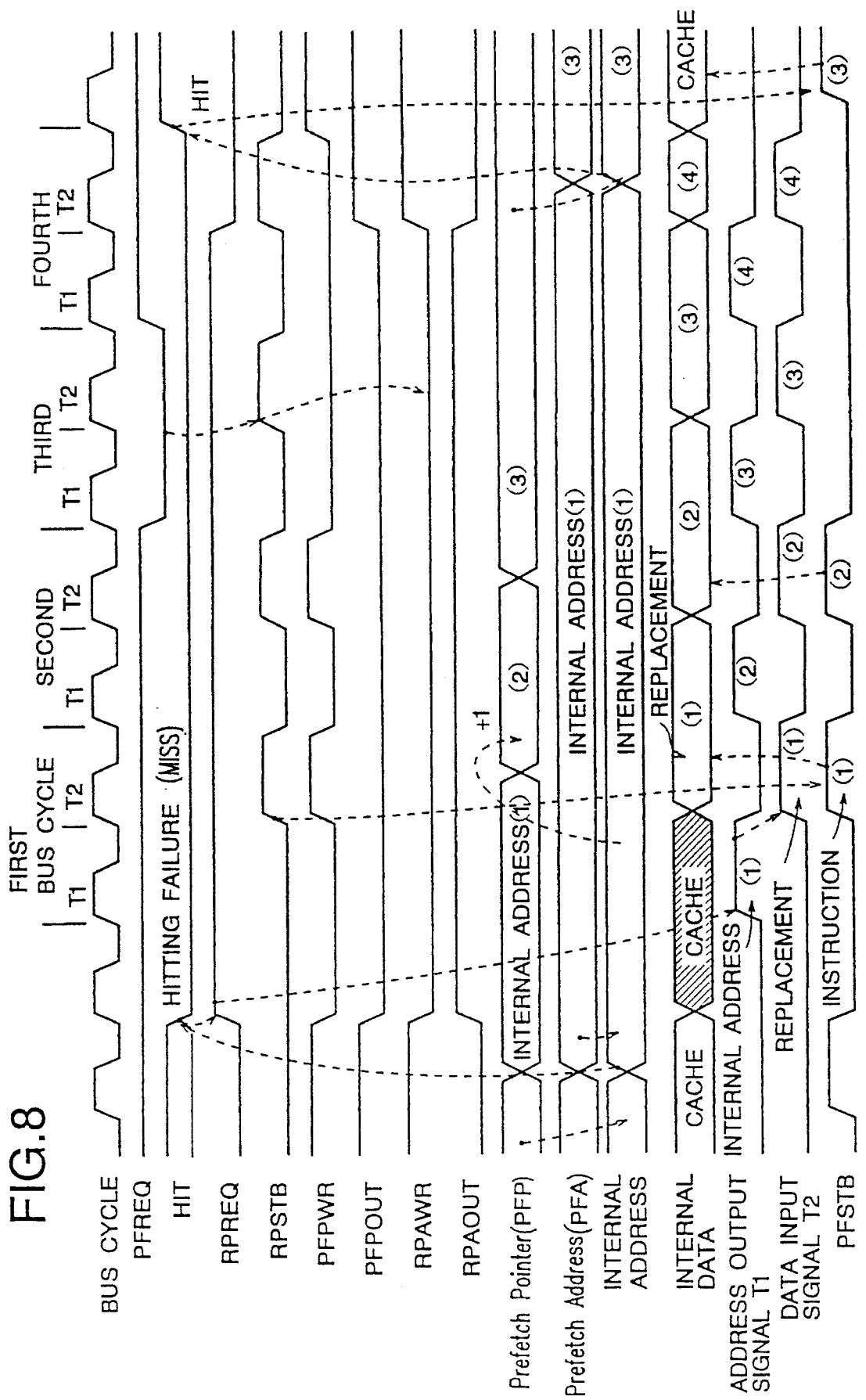
FIG. 8 is another timing chart of replacement processing by the cache memory unit according to an embodiment of the present invention.

FIG. 8 is a timing chart when the instruction code request signal (PFREQ) 103 becomes inactive during replacement (in the third bus cycle). In this case, even if all of the replacement data (replacement data (1) to (4) at the line marked internal data in FIG. 8) are transferred to the instruction decoding unit 70, and the instruction decoding unit 70 is busy processing a prior instruction, the replacement data after the third bus cycle (replacement (3) and (4) at the line marked internal data in FIG. 8) are retrieved from the cache memory 11 after completion of replacement. Accordingly, during replacement, the address contents in the prefetch pointer 13 are rewritten by the PFP write instruction signal (PFPWR) 111 for the number of transfers of the replacement data to the instruction decoding unit 70 (twice in this example). At the time of replacement completion, the prefetch pointer 13 stores the internal address obtained through two updates of the internal address (1), which caused a cache miss, and this internal address (3) retrieves the data (replacement (3)) from the cache memory 11.

As described above, when a cache miss occurs, the present invention enables data processing (instruction decoding or other operations) of all replacement data while simultaneously registering or storing the data to the cache memory 11. This reduces overhead during replacement. In addition, since the address in the prefetch pointer 13 is simultaneously updated during cache replacement, when compared to updating activated after replacement completion, the next access to the cache memory 11 can be expedited after replacement with easy control.

Obviously many modifications and variations of the present invention are possible. It is intended to cover in the appended claims all such modifications as fall 10 within the true spirit and scope of the invention.

What is claimed is:

1. A cache memory unit to be incorporated in a microprocessor comprising;

a cache memory, a first register means for storing an address for retrieval of data from the cache memory, an address updating means for updating the address stored in said first register means when a cache hit occurs, a second register means for storing an address which caused a cache miss when a cache miss occurs, a bus cycle control means for initiating a bus cycle clock sequence for replacement of data in the cache memory with data from main memory when a cache miss occurs, and a replacement control means for supplying the address stored in said second register means to said cache memory and for selectively updating the address stored in said first register means while said second register means supplies the address to said cache memory simultaneously.

2. A cache memory unit to be incorporated in a microprocessor of claim 1 wherein said replacement control means comprises an output means for outputting a write instruction signal which, when a cache miss occurs, instructs the writing of the address which caused the cache miss to said second register means, and a drive instruction signal to read the address written to the second register means.

3. A cache memory unit as in claim 1, wherein said bus cycle control means comprises a means for generating a bus cycle clock sequence for the replacement of data in the cache memory with data from main memory based on a replacement data request signal from said replacement control means, and a means for outputting a store instruction signal causing replacement data obtained during each bus cycle to be registered in said cache memory, said replacement control means comprises a means for outputting a write instruction signal which, when a cache miss occurs, instructs the writing of the address which caused the cache miss to said second register means, and a drive signal to read the address written to the second register means, and a means for outputting a transfer instruction signal causing the replacement data registered in said cache memory to be forwarded via an internal data bus to an instruction decoding means in the microprocessor.

4. A cache memory unit to be incorporated in a microprocessor of claim 1 wherein said bus cycle control means comprises a means for generating a bus cycle clock sequence for the replacement of data in the cache memory with data from main memory based on a replacement data request signal from said replacement control means, and a means for outputting a store instruction signal causing replacement data obtained during each bus cycle to be registered in said cache memory.

5. A cache memory unit to be incorporated in a microprocessor of claim 4 wherein said replacement control means comprises a means for outputting a transfer instruction signal causing the replacement data registered in said cache memory to be forwarded via an internal data bus to an instruction decoding means in the microprocessor.

6. A cache memory unit to be incorporated in a microprocessor comprising:

a cache memory, a first register means for storing an address for retrieval of data from said cache memory, an address updating means for updating the address stored in said first register means, a second register means for storing an address which caused a cache miss when a cache miss occurs, and a replacement control means for selectively updating the address stored in the first register means while said second register means supplies the address to said cache memory simultaneously.

7. A cache memory unit to be incorporated into a microprocessor of claim 6 wherein said replacement control means comprises a means for outputting, when a cache miss occurs, a write instruction signal to instruct the writing of the address which caused the cache miss to said second register means, and a drive instruction signal to read the address written to said second register means.

8. A cache memory unit to be incorporated in a microprocessor of claim 6 wherein said replacement control means comprises a means for outputting a transfer instruction signal for forwarding replacement data registered in said cache memory to an instruction decoding means in the microprocessor via an internal data bus.

9. A cache memory unit as in claim 6, wherein said replacement control means comprises a means for outputting a write instruction signal which, when a cache miss occurs, intructs the writing of the address which caused the cache miss to said second register means, and a drive signal to read the address written to the second register means, and a means for outputting a transfer instruction signal for forwarding replacement data registered in said cache memory to an instruction decoding means in the microprocessor via an internal data bus.

* * * * *